(12) United States Patent
Sasaki et al.

(10) Patent No.: US 8,564,674 B2
(45) Date of Patent: Oct. 22, 2013

(54) IMAGE PICKUP APPARATUS EQUIPPED WITH FUNCTION OF DETECTING IMAGE SHAKING

(75) Inventors: Masaaki Sasaki, Tokyo (JP); Shinichi Matsui, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 967 days.

(21) Appl. No.: 12/151,446

(22) Filed: May 7, 2008

(65) Prior Publication Data
US 2008/0284858 A1 Nov. 20, 2008

(30) Foreign Application Priority Data
May 18, 2007 (JP) ................................. 2007-132989

(51) Int. Cl.
*H04N 5/228* (2006.01)
*H04N 7/01* (2006.01)
*H04N 11/20* (2006.01)

(52) U.S. Cl.
USPC .......................... 348/208.1; 348/445; 348/452

(58) Field of Classification Search
USPC ........................................... 348/208.1; 396/52
See application file for complete search history.

(56) References Cited

U.S. PATENT DOCUMENTS

| 6,047,134 | A | 4/2000 | Sekine et al. | |
|---|---|---|---|---|
| 6,487,369 | B1 * | 11/2002 | Sato | 396/52 |
| 2005/0025243 | A1 * | 2/2005 | Sohn et al. | 375/240.16 |
| 2006/0152590 | A1 | 7/2006 | Kage et al. | |
| 2007/0147814 | A1 * | 6/2007 | Nomura et al. | 396/55 |
| 2007/0165960 | A1 * | 7/2007 | Yamada | 382/254 |
| 2007/0242900 | A1 * | 10/2007 | Chen et al. | 382/294 |

FOREIGN PATENT DOCUMENTS

| CN | 1846447 A | 10/2006 |
|---|---|---|
| EP | 0632649 A1 | 1/1995 |
| JP | 06-350895 | * 12/1994 |
| JP | 06-350895 A | 12/1994 |
| JP | 11-317904 A | 11/1999 |
| JP | 2000-023023 A | 1/2000 |
| JP | 2004-354420 A | 12/2004 |
| JP | 2006-050149 A | 2/2006 |
| JP | 2006-119199 A | 5/2006 |
| JP | 2006-174105 A | 6/2006 |
| JP | 2006-254358 A | 9/2006 |
| JP | 2006-311059 A | 11/2006 |
| KR | 2005-94414 A | 9/2005 |
| KR | 2006-99840 A | 9/2006 |
| WO | WO 2004/062270 A1 | 7/2004 |

OTHER PUBLICATIONS

Korean Office Action dated May 28, 2009 (4 pages), and English translation thereof (3 pages), issued in counterpart Korean Application Serial No. 10-2008-0045595.

(Continued)

*Primary Examiner* — Joel Fosselman

(74) *Attorney, Agent, or Firm* — Holtz, Holtz, Goodman & Chick, PC

(57) ABSTRACT

In an initial stage, using a global motion vector, a rough degree of image shaking is determined. After the image shaking is determined to have converged to some measure, using the difference values between frames, the finer degree of the image shaking is determined. And if it is determined to be free of image shaking, the recording photography is made to be done. Thereby, with certainty in the timing of no hand shaking and no image shaking, the photographing can be done.

15 Claims, 5 Drawing Sheets

FIG. 4

(56) References Cited

OTHER PUBLICATIONS

Extended European Search Report dated Jul. 27, 2010 (in English) issued in counterpart European Application No. 08290459.0.
Chinese Office Action dated Jul. 5, 2011 (and English translation thereof) in counterpart Chinese Application No. 200910225258.0.
Japanese Office Action dated Mar. 15, 2011 (and English translation thereof) in counterpart Japanese Application No. 2007-132989.
Japanese Office Action dated May 15, 2012 and English translation thereof in counterpart Japanese Application No. 2011-098987.

* cited by examiner

IMAGE PICKUP APPARATUS EQUIPPED WITH FUNCTION OF DETECTING IMAGE SHAKING

This application is based on and claims the benefit of priority from Japanese Patent Application No. 2007-132989, filed on 18 May 2007, the content of which is incorporated herein by reference.

BACKGROUND OF THE INVENTION

1. Field of the Invention

The present invention relates to an image pickup apparatus, an image pickup method, and an image pickup program, each having a function of detecting image shaking.

2. Related Art

Recently, digital cameras using an image pickup element such as CCD (Charged Coupled Device) have come into wide use in place of cameras using a traditional silver-salt film because of remarkable spread of personal computers and their high usability. When photographing the image of a subject with such a digital camera, a photographer decides upon the angle of view by moving a camera, steadies the camera so as to avoid hand shaking, and photographs by operating the shutter key.

However, even if the photographer intends to steady the camera securely, when photographing, the camera sometimes ends up moving, causing the hand shaking. Consequently, in order to suppress the influence of the hand shaking, digital cameras mounted with a function of correcting hand shaking have entered in the field as shown in, for example, Japanese Unexamined Patent Application Publication No. H06-350895.

In addition, when the subject is a human being and the like, the photographer induces him or her to be motionless, giving a cue to take a photograph after deciding upon the angle of view. And yet, it sometimes happens that the human being to be the subject ends up moving after being induced to be motionless, causing the shaking of the image. Such image shaking is difficult to be corrected by only conventional shaking corrections.

Consequently, it can be considered to enable carrying out recording photography at a timing when the image shaking does not occur by detecting the timing when image shaking such as hand shaking and subject shaking does not occur.

As described above, in order to enable carrying out recording photography at a timing when the image shaking does not occur, it is desired to be capable of detecting the hand shaking and subject shaking accurately. For detecting hand shaking, it is known to use a motion vector as shown in, for example, Japanese Unexamined Patent Application Publication No. H06-350895.

And yet, there has been a problem that the motion vector can detect rough hand shaking when the camera is being moved, but it is difficult to detect accurately the motion of the subject.

SUMMARY OF THE INVENTION

An embodiment of the present invention is an image pickup apparatus equipped with a function of detecting image shaking, including: a first image shaking detection means for detecting image shaking, a second image shaking detection means for detecting image shaking by a method different from the first image shaking detection means, and a determination means for determining that image shaking has disappeared, when, after image shaking detected by the first image shaking detection means is determined to have converged, further, image shaking detected by the second image shaking detection means is determined to have converged.

Another embodiment of the present invention is an image pickup apparatus equipped with a function of detecting image shaking, including: a difference value calculation means for calculating a difference value between two successive image frames, a high frequency component detection means for detecting a high frequency component in the image frames, and a determination means for determining whether image shaking is present or not based on the difference value calculated by the difference value calculation means, excluding the image frames in which the high frequency component is lower than a reference value from an object of evaluation.

Another embodiment of the present invention is an image pickup apparatus equipped with a function of detecting image shaking, including: a difference value calculation means for calculating a difference value between two successive image frames, a holding means for holding the minimum difference value among the difference values successively detected by the difference value calculation means, and a determination means for updating the difference value held by the holding means with a new difference value calculated by the difference calculation means corresponding to a new frame when the new difference value is lower than the held difference value, and determining that image shaking has disappeared when the number of times of the update becomes more than a predetermined number of times.

Another embodiment of the present invention is a method for controlling an image pickup device equipped with a function of detecting image shaking, including: a first image shaking detection step of detecting image shaking, a second image shaking detection step of detecting image shaking by a method different from the first image shaking detection step; and a determination step of determining that image shaking has disappeared, when, after image shaking detected by the first image shaking detection means is determined to have converged, further, image shaking detected by the second image shaking detection means is determined to have converged.

Another embodiment of the present invention is a method for controlling an image pickup apparatus equipped with a function of detecting image shaking, including: a difference value calculation step of calculating a difference value between two successive image frames, a high frequency component detection step of detecting a high frequency component in the image frames, and a determination step of determining whether image shaking is present or not based on the difference value calculated by the difference value calculation means, excluding image frames in which the high frequency component is lower than a reference value from an object of evaluation.

Another embodiment of the present invention is a method for controlling an image pickup apparatus equipped with a function of detecting image shaking, including: a difference value calculation step of calculating a difference value between two successive image frames, a holding step of holding the difference value detected in the difference value calculation step, an update step of updating the held difference value with a new difference value calculated in the difference calculation step corresponding to a new frame, when the new difference value is lower than the difference value held by the holding step, and a determination step of determining that the image shaking has disappeared, when the number of times of the update has become more than a predetermined number of times.

DETAILED DESCRIPTION OF THE INVENTION

Hereinafter, a preferred embodiment of the present invention is described with reference to the drawings.

Figure 1A:
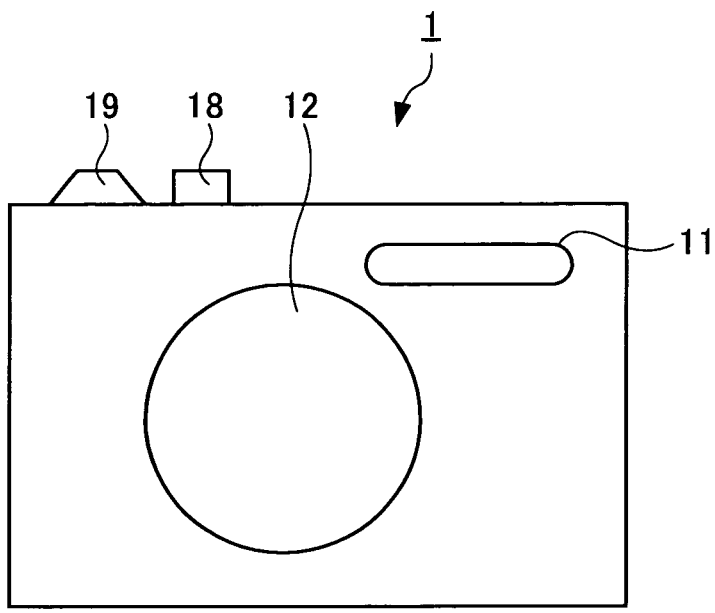
FIG. 1A is an external diagram of a configuration (front view) of the image pickup apparatus according to the present invention.
Figure 1B:
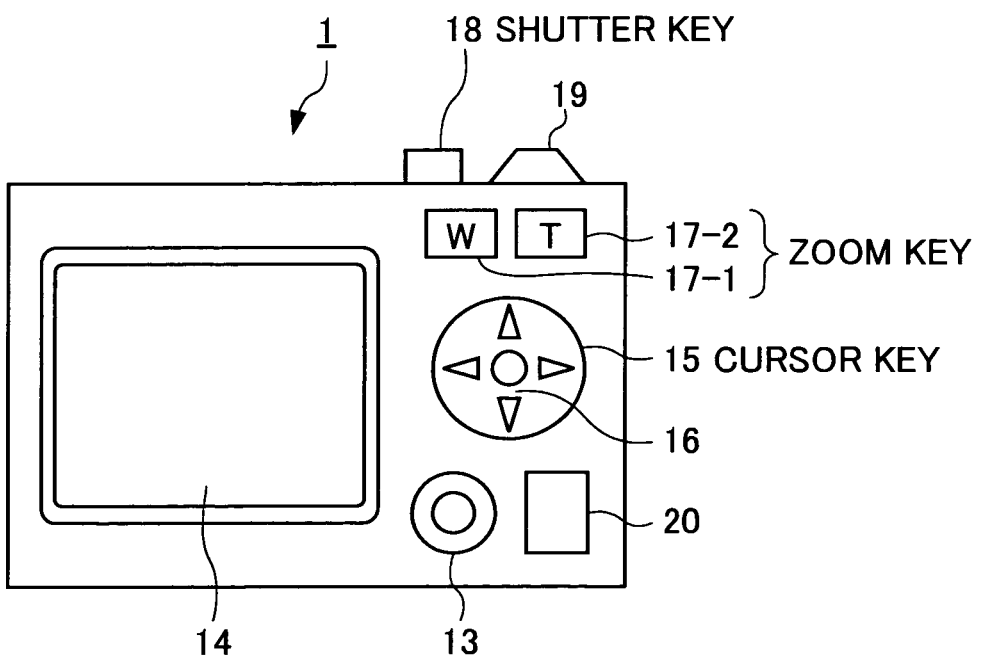
FIG. 1B is an external diagram of a configuration (back view) of the image pickup apparatus according to the present invention.

FIG. 1 shows an outline of a configuration of an image pickup apparatus (digital camera 1) of the present embodiment, FIG. 1(a) shows a front view thereof, and FIG. 1(b) shows a back view thereof. The image pickup device (digital camera 1) is, as shown in FIG. 1, equipped with a strobe flash unit 11 and an image pickup lens (lens group) 12 on its front side.

On a back side of the image pickup apparatus (digital camera 1), as shown in FIG. 1(b), a mode dial 13, a liquid crystal monitor display 14, cursor keys 15, a set key 16, a zoom key ("Wide" button 17-1, "Tele" button 17-2) 17 used when performing telescopic photographing, and a photographing mode selection key 20, and the like, are provided.

Further, on the upper surface of the image pickup apparatus (digital camera 1), as shown in FIG. 1(a) and FIG. 1(b), a shutter key 18 and a power source key 19 and the like are provided. On the side (not shown in the figure) of the image pickup apparatus (digital camera 1), a connecting portion of a USB (Universal Serial Bus) terminal used when connecting external devices, such as personal computers and modems, by USB cables, and slots for inserting memory cards and the like, are provided.

Figure 2:
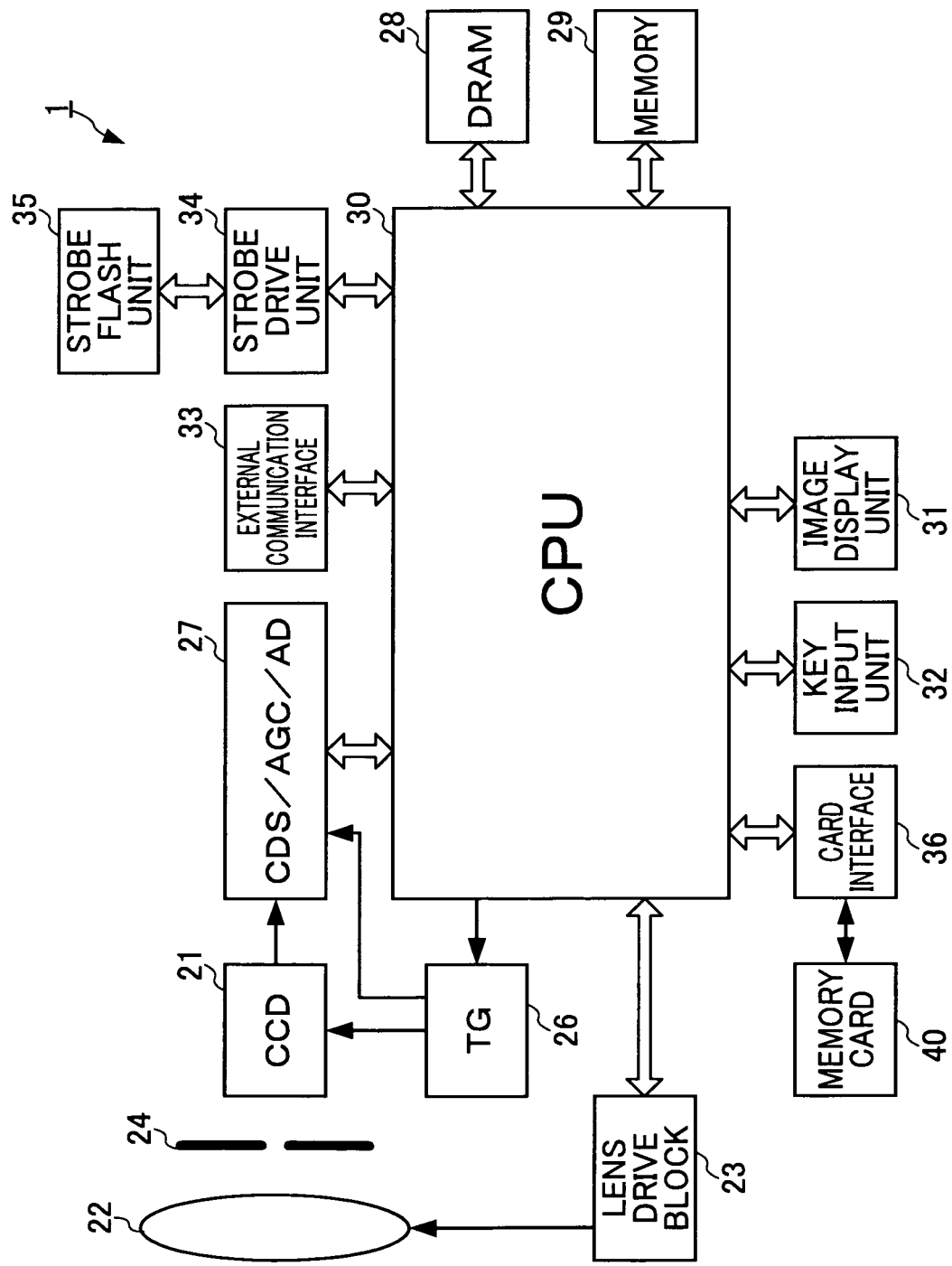
FIG. 2 is a block diagram of an electrical configuration of the image pickup apparatus according to the present invention.

FIG. 2 shows an electrical configuration of the inside of the image pickup apparatus (digital camera 1) of the present embodiment. The image pickup apparatus (digital camera 1) of the present embodiment includes, as shown in FIG. 2, an image pickup lens 22, a lens drive block 23, a shutter 24 serving also as an aperture, a CCD image pickup element 21, a TG (Timing Generator) 26, a unit circuit (CDS/AGC/AD) 27, a DRAM (Dynamic Random Access Memory) 28, a memory 29, a CPU (Central Processing Unit) 30, an image display unit 31, a key input unit 32, an external communication I/F (Interface) 33, a strobe driver 34, a strobe flash unit 35, and a card I/F (Interface) 36, and in the card I/F 36, a memory card 40 is detachably connected to the card slot (not shown in the figure) of the digital camera 1 body.

The image pickup lens 22 includes a focus lens, and a zoom lens, to which a lens drive block 23 is connected. The lens drive block 23 includes a focus motor and a zoom motor which drive respectively the focus lens and the zoom lens, both of which are not shown in the figure, in an optical axis direction in parallel to an image pickup plane, and a focus motor driver and a zoom motor driver which respectively drive the focus motor and the zoom motor according to a control signal from the CPU 30.

The shutter 24 serving also as an aperture includes a driver circuit not shown in the figure, and this driver circuit operates the shutter serving also as an aperture according to a control signal sent from the CPU 30. In addition, this shutter 24 serving also as an aperture functions as an aperture and a shutter.

The CCD image pickup element 21 converts the light of a subject projected through the image pickup lens 22 and the shutter 24 serving also as an aperture into an electric signal, and outputs it to the unit circuit (CDS/AGC/AD) 27 as an image pickup signal. Moreover, the CCD image pickup element 21 operates according to a timing signal of a predetermined frequency generated by the TG 26. In addition, to the TG 26, the unit circuit (CDS/AGC/AD) 27 is connected.

The unit circuit (CDS/AGC/AD) 27 includes a CDS (Correlated Double Sampling) circuit which carries out correlated double sampling of the image pickup signal output from the image pickup element 21, an AGC (Automatic Gain Control) circuit which carries out an automatic gain control of the image pickup signal after the sampling, and an A/D converter which converts the analog image pickup signal after the automatic gain control to a digital signal. The image pickup signal of the CCD image pickup element 21 is sent to the CPU 30 as a digital signal through the unit circuit (CDS/AGC/AD) 27.

The CPU 30 has functions to carry out image processing (interpolation processing between pixels, gamma correction, generation of a luminance and chrominance signal, white balance processing, exposure adjustment processing and the like), shaking correction processing, and compression/expansion (for example, JPEG type compression/expansion) of image data sent from the unit circuit (CDS/AGC/AD), and at the same time, it is a one-chip microcomputer which controls each portion of the digital camera 1 according to control programs.

The DRAM 28 is used as a buffer memory to store temporarily image data sent to the CPU 30 after being image-picked-up by the CCD image pickup element 21, and at the same time, it is used as a working memory of the CPU 30.

The image display unit 31 includes a color LCD (Liquid Crystal Display) and its driver circuit, displays an image-picked-up subject by the CCD image pickup element 21 as a through image while in photographing-standby, and displays expanded recorded images read out from the memory card 40 while in the playback of recorded images.

The key input unit 32 includes a plurality of keys such as the mode dial 13, the cursor keys 15, the set key 16, the zoom key 17, the shutter key 18, the power button 19, and the photographing mode selection key 20 (see FIG. 1(a) and FIG. 1(b)), and outputs operation signals to the CPU 30 in response to key operation of a user.

The external communication I/F 33 is adapted to carry out data input/output between external electronic devices (for example, personal computers), and makes it possible to carry out input/output by various interface specifications, such as the USB specification and the IEEE 1394 specification, and is capable of being connected to electronic devices such as personal computers to which it is possible to carry out data-input/output under these specifications. Moreover, the external communication I/F 33 may be capable of inputting/outputting image data with external electronic devices by infrared data communication under the IrDA specification, and by wireless communication under the Bluetooth specification.

The strobe driver 34 flash-drives the strobe flash unit 35 according to a control signal of the CPU 30, and the strobe flash unit 35 carries out the strobe flash thereby. The CPU 30 determines whether the photographing scene is dark or not by a photometry circuit not shown in the figure, and outputs a control signal to the strobe driver 34 when the scene is determined to be dark and the photographing is carried out (when the shutter key is pushed down).

The memory 29 stores and records program and data necessary for the CPU 30 to control each portion of the digital camera 1, and the CPU 30 performs processing according to this program.

In the image pickup apparatus (digital camera 1), when the shutter key 18 (included in the key input unit 32) is operated, a subject-image light is taken in the CCD image pickup element 21 through the image pickup lens 22 and the shutter 24 also serving as an aperture, and by the CCD image pickup element 21, this image is converted into an electric signal and output to the unit circuit (CDS/AGC/AD) 27. In addition, by the CPU 30, image processing is carried out on the image data sent from the unit circuit (CDS/AGC/AD) 27, and the image data is compressed by JPEG or the like, and recorded on the memory card 40.

At this moment, if the camera happens to move or the subject happens to move when the photographer photographs with the image pickup apparatus, blur ends up being generated in the photographed image due to image shaking. Consequently, the present embodiment is designed so that hand shaking and subject shaking are detected, and that, when hand shaking and subject shaking have converged, photographic recording can be carried out. Hereinafter, description is made concerning an operation to enable the photographic recording after hand shaking and subject shaking have converged.

Figure 3:
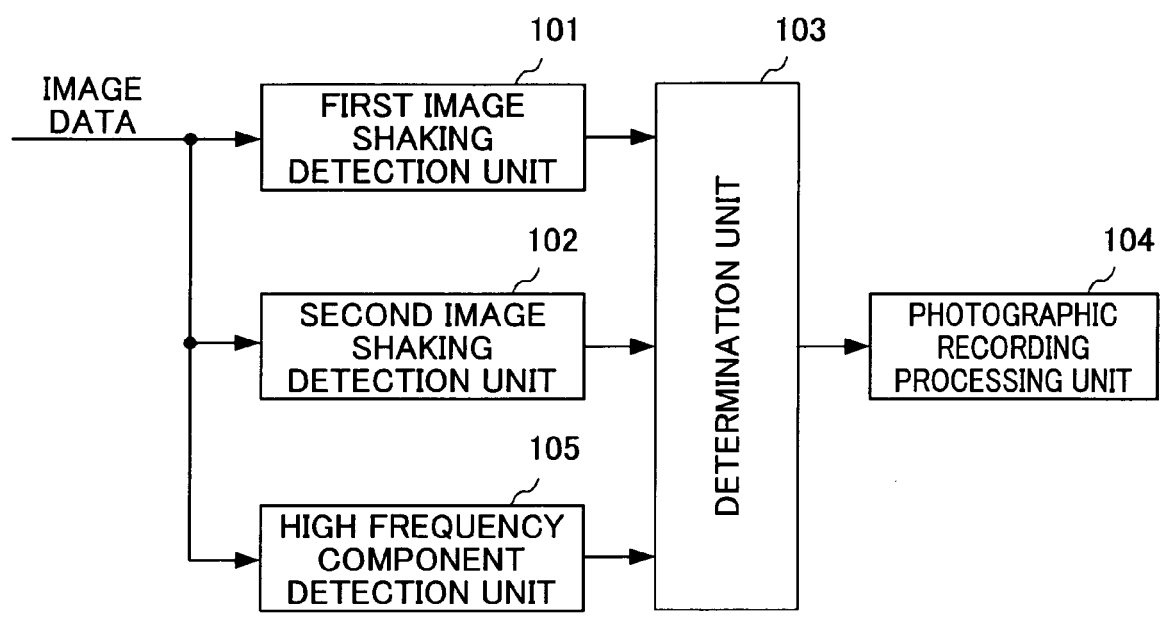
FIG. 3 is a functional block diagram used for explaining the image pickup apparatus according to the present invention.

FIG. 3 is a functional block diagram showing a configuration to implement a function in the present embodiment for detecting hand shaking and subject shaking to control timing for the photographic recording. In addition, this functional diagram can be implemented by software using the CPU 30.

As shown in FIG. 3, in the present embodiment, a first image shaking detection unit 101 and a second image shaking detection unit 102, and a determination unit 103 are provided. The first image shaking detection unit 101 and the second image shaking detection unit 102 are both adapted to detect image shaking from image data, but speed of detection and accuracy of detection are different. Further, in the present embodiment, a high frequency component detection unit 105 is provided to detect a high frequency component in an image frame. Additionally, the operation of the high frequency component detection unit 105 is described later.

The first image shaking detection unit 101 is adapted to detect a degree of occurrence of large image shaking in an initial stage of photographing. In other words, when photographing, the photographer moves the digital camera 1 to decide upon an angle of view, and after the angle of view is decided upon, the photographing is carried out with the digital camera 1 being made to stand still. Accordingly, in the initial stage of photographing, rough image shaking is needed to be detected so as to detect that the digital camera 1 is made to have stood still to some measure. The first image shaking detection unit 101 detects such image shaking in the initial stage of photographing. For the first image shaking detection unit 101, high detection accuracy is not required, but what can detect large image shaking with high speed is required. In other words, when the shaking or the blur of the photographed image are large due to occasional wide movement of the camera and the subject, or due to being out-of-focus to the subject, it is necessary to detect the image shaking quickly.

On the other hand, the second image shaking detection unit 102 detects fine image shaking after hand shaking has converged to some measure. In other words, the photographer photographs after deciding upon an angle of view, making the digital camera 1 stand still. However, at this moment, there may be a case in which the digital camera 1 happens to move slightly or the subject happens to move. The second image shaking detection unit 102 detects a degree of occurrence of hand shaking with high accuracy while the photographer is making the digital camera 1 stand still after deciding upon an angle of view. For the second image shaking detection unit 102, it is not required to detect rough hand shaking, but it is required to detect image shaking with high accuracy. In other words, it is required to detect image shaking with high accuracy while the shaking or blur of the photographed image is small, when the movement of the camera and the subject becomes small and the focus is placed on the subject.

The determination unit 103 determines, at the beginning, a degree of large image shaking based on detected output from the first image shaking detection unit 101, and after determining that the image shaking has converged to some measure, determines more finely the degree of image shaking based on detected output from the second image shaking detection unit 102, and if it is determined that there is no image shaking, the determination unit 103 sends a signal showing that there is no hand shaking or no image shaking to the photographic recording processing unit 104 to carry out photographic recording.

Thus, in the present embodiment, the first image shaking detection unit 101 which can detect at high speed rough image shaking while out of focus, and the second image shaking detection unit 102 which can detect the image shaking with high accuracy while in focus, are provided. At the beginning, based on the detected output from the first image shaking detection unit 101, a degree of rough image shaking is determined, and after determining that the image shaking has converged to some measure, according to detected output from the second image shaking detection unit 102, the degree of image shaking is determined more finely, and if it is. determined that there is no image shaking, photographic recording is made to be carried out. Thus, with certainty at a timing when there is no hand shaking and no image shaking, photographing can be carried out.

In addition, the photographic recording processing unit 104 may be controlled so that, when a signal which shows no hand shaking and no image shaking being present is sent from the determination unit 103, recording photography is carried out automatically. In addition, the photographic recording processing unit 104 may be controlled so that, when a signal which shows no hand shaking and no image shaking being present is not sent from the determination unit 103, the photographing is inhibited. Moreover, the photographic recording processing unit 104 may be controlled so that, based on a signal which shows no hand shaking and no image shaking being present, timing of photographing is determined and an alarm is generated when under instruction to photograph.

Next, the first and the second image shaking detection units 101 and 102 are described in detail.

The first image shaking detection unit 101 determines that the digital camera 1 has entered a state of standing still by detecting rough image shaking as described above. The state of the camera 1 being made standing still is that the motion of the whole angle of view becomes small, which can be obtained from a global motion vector (GMV).

In other words, taking notice of one point in the image frame Fn−1, by finding where the point moves in the next frame Fn, it is possible to find the motion vector for the point. However, in the subject, there are background segments and moving segments, and it is not possible to determine the whole movement by the motion vector of moving segments.

For example, when the subject moves toward the opposite direction of the direction of the hand shaking, in spite of the occurrence of hand shaking, it is conceivable that the motion vector may become a very small value.

Consequently, in the present embodiment, N (N is a sufficiently large integer) feature points are extracted, N motion vectors are obtained, a support number is calculated, the vector of the largest support number is made to be the global motion vector (GMV), it is determined that the digital camera 1 has become standing still when this global vector has become small.

Here, the support number shows how many motion vectors are the same as a motion vector with respect to one motion vector. In other words, if one motion vector is made to be MVa, the remaining motion vectors are made to be MVi (i is an integer form 0 to N), D is set to a constant, and the support number can be calculated as the number of motion vectors satisfying |MVa−MVi|<D.

Since the motion vectors of the background segment reflects the overall motions, there are many motion vectors which become similar values, and the support number becomes large. On the other hand, since the motion vectors of a moving subject are different from those of the whole motions, the support number becomes small. From this fact, it turns out that the motion vector whose support number is large shows a global motion vector (GMV).

On the other hand, the second image shaking detection unit 102 is, as described above, adapted to detect fine image shaking after hand shaking has converged to some measure. Such fine image shaking can be detected according to difference values between image frames.

In other words, if the coordinate of the image frame Fn is made to be Fn (x, y), the difference value between image frames can be calculated as $\Sigma|Fn(x, y) - Fn-1(x, y)|$ ($\Sigma$ is an accumulated value for whole pixels). When image shaking occurs, a difference value between image frames becomes large, and when the image shaking disappears, a difference value between image frames approaches zero.

Consequently, in the present embodiment, a difference value between image frame Fn and the image frame Fn−1 is obtained, and when the difference value between image frames becomes small, the situation is made to be determined as having no image shaking.

However, actually, the difference value between image frames never becomes zero because of the influence of random noises or the like. Moreover, since the difference value between image frames varies according to the circumstances of photographing, the conditions of exposure, and gain and the like, the threshold value can not be decided upon uniformly. Consequently, in the present embodiment, the difference value between image frames which is determined initially becomes gradually smaller, and when it becomes small to some measure, the situation is made to be determined as having no image shaking.

Stated differently, the difference value between image frames is obtained in the first image frame in the initial stage, and this difference value between image frames is registered as the reference value A. In addition, the difference value between image frames detected in the subsequent image frames are continued to be compared with the reference value A. Here, when the subsequent difference value between image frames becomes smaller than the reference value A, it can be determined that, in the image frame, the image shaking becomes smaller than the image frame in which the reference value A is obtained.

In this case, the reference value A is updated by the difference value between image frames obtained then, and similar processing is repeated a plurality of times. Thereby, the difference value between image frames becomes gradually small making it possible to determine that it has become small to some measure. In addition, when the number of times of update of the reference value A becomes more than a predetermined number of times, the situation is determined as having no image shaking.

And yet, there is a case in which the correct evaluation of the size of shaking of a subject can not be done by only these conditions. For example, in such cases that blur or shaking occurs in the image because of a camera not yet being in focus on a subject, or because of a subject moving significantly between image frames, or that an image uniformly pitch dark, reliability of the difference between image frames is low.

Consequently, in the present embodiment, a high frequency component detection unit 105 to detect a high frequency component in an image frame is provided. In other words, by the high frequency component detection unit 105, the high frequency component in an image frame is detected, and the image frame whose high frequency component is lower than a reference value is excluded from the object of evaluation according to the difference value between image frames. Thereby, in the preparation stage of photographing in which a camera is not in focus on the subject, or in which a camera is moving significantly, the resultant misdetection that image shaking has converged is made to be prevented.

Stated differently, the high frequency components are calculated from the first image frame at the initial stage, and, based on those values, the reference value B of the high frequency component is set. After the next time, the high frequency component is obtained in the image frame, and the obtained high frequency component and the reference value B continue to be compared. In addition, image frames whose obtained high frequency component is lower than the reference value B are determined to have image blur, and thus excluded from the evaluation of image shaking based on difference values between image frames.

Thus, the second image shaking detection unit 102 determines image shaking using the two of the difference value between the frames and the high frequency component in the image frames. Stated differently, when the reference value between frames updated as described above is made to be A, and the reference value of the high frequency components set in the initial stage is made to be B, it is determined whether both of the following two conditions are satisfied or not.

Condition (1): The difference value between image frames is lower than the reference value A.

Condition (2): The high frequency component in the image frame is greater than the reference value B.

Figure 4:
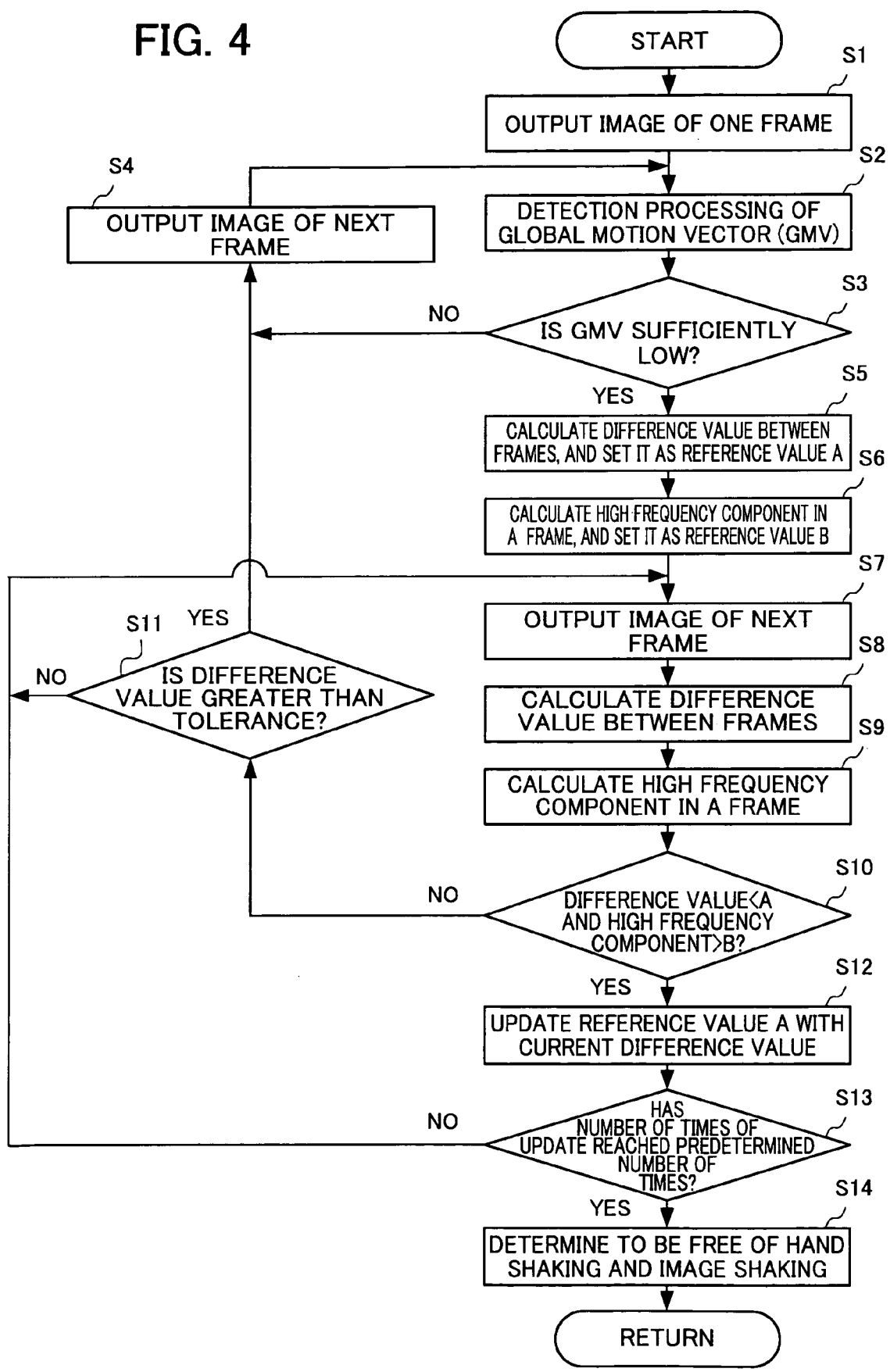
FIG. 4 is a flow chart (overall processing) used for explaining the image pickup apparatus according to the present invention.

FIG. 4 is a flow chart for carrying out the above processing.

In FIG. 4, the image of one image frame of the picked-up image is output (step S1), and the detection processing of the global motion vector (GMV) is carried out (step S2). In the detection processing of the global motion vector (GMV), N feature points are extracted, N motion vectors are obtained, the support number is calculated, and the processing to make the motion vector of the highest support number to be the global motion vector (GMV) is carried out. Additionally, concerning the detection processing of the global motion vector (GMV), the description is made later.

When the global motion vector (GMV) is detected, this global motion vector (GMV) is evaluated, and it is determined whether the global motion vector (GMV) is sufficiently low or not (step S3).

In the case that the photographer is deciding upon the angle of view, since the digital camera 1 is not standing still, the global motion vector (GMV) becomes a high value. In other words, if the global motion vector (GMV) is high (the case of "No" of step S3), the processing is moved to the next image frame (step S4), the step is returned to step S2, and the detection processing of the global motion vector (GMV) is continued.

When the photographer decides upon the angle of view and makes the digital camera 1 stand still, the global motion vector (GMV) becomes a low value. In other words, in step S3, if the global motion vector (GMV) is sufficiently low (the case of "Yes" of step 3), the difference value between image frames is obtained and this difference value between image frames is made to be the reference value A (step S5). The difference value between image frames is calculated, as described above, as $\Sigma|Fn(x,y)-Fn-1(x,y)|$. In addition, the high frequency component in the image frame is obtained, and this high frequency component in the image frame is made to be the reference value B (step S6).

The image of the next image frame is output (step S7), the difference value between image frames is obtained (step S8), the high frequency components in the image frame are obtained (step S9). In addition, it is determined whether the difference value between image frames is lower than the reference value A or not, and the high frequency components in the image frame are greater than the reference value B or not (step S10).

When the difference value between image frames is greater than the reference value A, or the high frequency components in the image frame are lower than the reference value B (the case of "No" of step 10), it is determined whether the difference value between image frames is greater than the tolerance or not (step S11), if the difference value between image frames is not greater than the tolerance (the case of "No" of step 11), the step is returned to step S7.

When the hand shaking does not converge, or the image shaking of a subject occurs, the difference value between image frames becomes greater than the reference value A. Moreover, when the display image becomes blurred, the high frequency components in the image frame become lower than the reference value B. Hence, in these cases, the determined result of step S10 becomes "No", and step S7-step S11 are repeated.

In addition, there is a case that the photographer moves the digital camera 1 largely unsetting the angle of view once decided upon. In this case, in step S11, the difference value between image frames is then determined as high. Accordingly, in such a case (the case of "Yes" of step 11), in step S4, the processing is moved to the next frame, and the step is returned to step S2.

Here, the reference value A is described. While the camera is moved in order to set in a subject within a frame, since the image continues to move in a constant direction, the difference value between image frames continues to be high. But after the subject is set in the frame, since the image becomes to repeat the vibration vertically and horizontally, the state of the difference value between image frames being high and being low becomes repeated. The reference value A holds the difference value when it was minimum in the past, while the difference value being high and being low is repeated. If the hand shaking and the image shaking gradually converges, there occurs the case once among several times that the difference value between image frames becomes lower than the reference value A. If the displayed image is not blurred, the high frequency components in the image frame become greater than the reference value B. Hence, in these cases, the result of judge of step S10 becomes "Yes".

In step S10, when the difference value between image frames is lower than the reference value A, and the high frequency components in the image frame are greater than the reference value B (the case of "Yes" of step S10), the reference value A which is the difference value being minimum in the past is updated by the difference value between current image frames (step S12). Then, it is determined whether the number of times of the update has reached the predetermined number of times or not (step S13), if the number of times of the update has not reached the predetermined number of times (the case of "No" of step S13), the step is returned to step S7.

Thus, the difference value between image frames of the initial frame is made to be the reference value A, the difference value between image frames of subsequent frames and the reference value A are continued to be compared, when the difference value between image frames of subsequent frames becomes lower than the reference value A, the reference value A is updated by the difference value between image frames obtained then, subsequently the similar processing is repeated a plurality of times. In addition, when the difference value between image frames becomes lower gradually while repeatedly being high and being low by such operations, it is possible to detect that the amplitude of the vibration becomes low.

When the number of times of the update reaches the predetermined number of times in step S13 (the case of "Yes" of step S13), the hand shaking and the subject shaking are determined to have converged (step S14).

Figure 5:
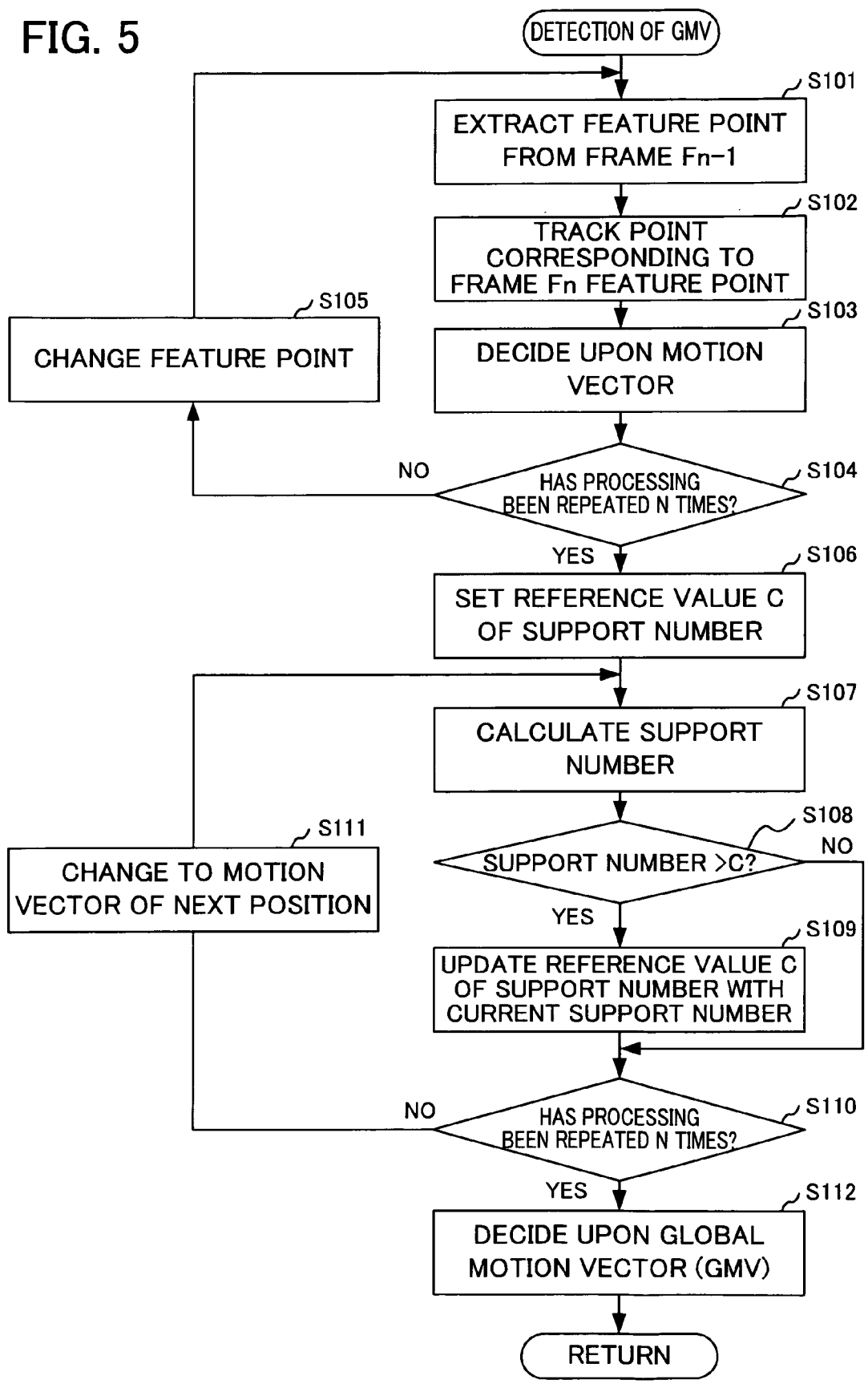
FIG. 5 is a flow chart (motion vector detection processing) used for explaining the image pickup apparatus according to the present invention.

FIG. 5 is a flow chart showing the detection processing of the global motion vector (GMV) of step S2 in FIG. 4.

In FIG. 5, N feature points are extracted from the image frame Fn-1 (step S101), subsequent image frames Fn are compared with them, and it is tracked where each feature point has moved (step S102). Thereby, the motion vector is obtained (step S103).

It is determined whether the processing is repeated N times or not (step S104), if it has not been repeated N times (the case of "No" of step S104), the processing is moved to the next feature point (step S105), and the step is returned to step S101, the similar processing is repeated. Thereby, the N motion vectors of each point are obtained. When the motion vectors concerning all N blocks are obtained, it is determined in step S104 that processing has been repeated N times.

When it is determined in step S104 that processing has been repeated N times (the case of "Yes" of step S104), the reference value C of the support number is set to an initial value (for example, 0) (step S106). In addition, the support number concerning one motion vector is calculated (step S107). Here, as described above, the support number can be calculated as the number of motion vectors satisfying $|MVa-MVi|<D$.

When the support number is obtained, it is determined whether the obtained support number is greater than the reference value C or not (step S108).

If the currently obtained support number in step S108 is greater than the reference value C (the case of "Yes" of step S108), the reference value C of the support number is updated by the current support number (step S109), and it is determined whether processing has been repeated N times or not (step S110). In step S108, if the support number is equal to or lower than the reference value C (the case of "No" of step S108), the reference value C of the support number is left as it is, and it is determined whether processing has been repeated N times or not (step S110).

In step S110, if the processing has not been repeated N times (the case of "No" of step S110), the processing is shifted to the motion vector of the next position (step S111), the step is returned to step S107, and similar processing is repeated.

By this processing being repeated, the reference value C of the support number continues to be updated to the maximum value of the support number until then.

In step S110, if it is determined that processing has been repeated N times (the case of "Yes" of step S110), from the reference value C of the support number, the maximum value of the support number until then is determined, and from the motion vector whose support number becomes maximum, the global motion vector (GMV) is obtained (step S112).

As described above, in the present embodiment, initially, using the global motion vector (GMV), the rough degree of the image shaking is determined, after the image shaking is determined to have converged to some measure, using the difference values between image frames, the finer degree of the image shaking is determined, and if it is determined to be free of image shaking, the recording photography is made to be done. Thereby, with certainty in the timing of no hand shaking and no image shaking, the photographing can be done.

In addition, in the present embodiment, the detection of the motion vector is carried out, but in digital cameras equipped with real time compression recording means of moving images such as MPEG, since the motion vector at the time of moving image compression is detected, the detection of the image shaking may be carried out using the motion vector detected at the time of moving image compression. In this case, since it becomes not necessary to carry out the exclusive motion vector detection processing, processing efficiency and processing speed can be improved.

In addition, in the present embodiment, the high frequency component of an image is detected, but in digital cameras equipped with an auto-focusing function, it can be made so that the high frequency component is detected using contrast information detected at the time of auto-focusing processing. In addition, it may be made so that the image shaking detection by the first image shaking detection unit is carried out while the auto-focusing is in operation, and that after the operation of the auto-focusing has been completed, the image shaking detection by the second image shaking detection unit is carried out.

In addition, in digital cameras equipped with an auto-exposure function, the procedure may be designed so that the image shaking detection by the first image shaking detection unit is carried out while auto-exposure is in operation, and that after the operation of the auto-exposure has been completed, image shaking detection by the second image shaking detection unit is carried out.

In addition, the program to be used as the source is provided by such recording media capable of being read by computers as portable media such as flexible disk, magneto optical disk, ROM, CD-ROM, and the like. Moreover, the program to be used as the source may be transmitted from a computer system to other computer systems through transmitting media or transmission waves in the transmitting media. Here, the "transmission media" means a an media having functions of transmitting information, such as networks (communication networks) of the Internet and the like, and communication lines (communication wires) of telephone lines and the like. In addition, the program to be used as the source may be what implements a part of the above-described functions. Further, the program to be used as the source may be a so-called difference file (difference program) which can implement the above described function in combination with a program which has already been recorded in a computer system.

Furthermore, a constituent element in the present embodiment is properly replaceable with a ready-made constituent element, and a large variety of variations including combinations with other ready-made constituent elements are possible. Accordingly, the description of the embodiment does not limit the scope of the present invention as defined in the appended claims.

What is claimed is:

1. An image pickup apparatus having a function of detecting image shaking, comprising:
    a first image shaking detection unit which detects image shaking based on a size of a motion vector which represents a movement amount of each pixel and is detected from a plurality of successively obtained image frames;
    a second image shaking detection unit which calculates a difference value obtained by comparing respective pixel values of pixels located at identical positions in a plurality of successively obtained image frames, to detect image shaking; and
    a determination unit which determines whether image shaking detected by the first image shaking detection unit has converged by comparing the motion vector with a first threshold, and which determines whether image shaking detected by the second image shaking detection unit has converged by comparing the difference value with a second threshold;
    wherein the determination unit determines that image shaking has disappeared, when, after image shaking detected by the first image shaking detection unit is determined to have converged, image shaking detected by the second image shaking detection unit is further determined to have converged; and
    wherein the determination unit does not determine that image shaking has disappeared before image shaking detected by the first image shaking detection unit is determined to have converged, even if image shaking detected by the second image shaking detection unit is determined to have converged.

2. An image pickup apparatus according to claim 1, wherein the second image shaking detection unit starts detection processing of image shaking after image shaking detected by the first image shaking detection unit is determined to have converged.

3. An image pickup apparatus according to claim 1, wherein when image shaking is determined to have disappeared by the determination unit, photographic recording is automatically carried out.

4. An image pickup apparatus according to claim 1, wherein during a time when image shaking is determined to be present by the determination unit, photographic recording is inhibited or warned against by alarm at a time of receiving an instruction to photograph.

5. An image pickup apparatus according to claim 1, wherein detection accuracy of image shaking by the second image shaking detection unit is higher than detection accuracy of image shaking by the first image shaking detection unit.

6. An image pickup apparatus according to claim 1, wherein detection accuracy of image shaking by the second image shaking detection unit deteriorates while the image pickup apparatus is not focused on a subject, and a degree of deterioration of the accuracy is greater than a degree of deterioration of detection accuracy of image shaking by the first image shaking detection unit while the image pickup apparatus is not focused on the subject.

7. An image pickup apparatus according to claim 1, wherein detection accuracy of image shaking by the second image shaking detection unit deteriorates while motion of a subject or the image pickup apparatus is large, and a degree of deterioration of the accuracy is greater than a deterioration of detection accuracy of image shaking by the first image shaking detection unit while motion of the subject or the image pickup apparatus is large.

8. An image pickup apparatus according to claim 1, wherein the first image shaking detection unit detects a component of image shaking caused by hand shaking among a component of image shaking caused by hand shaking and a component of image shaking caused by motion of a subject, and the second image shaking detection unit detects image shaking irrespective of the component of image shaking caused by hand shaking and the component of image shaking caused by motion of the subject.

9. An image pickup apparatus according to claim 1, wherein the motion vector is a motion vector of a whole image obtained by photographing.

10. An image pickup apparatus according to claim 1, wherein the determination unit holds, as the second threshold, a minimum difference value among difference values successively detected by the second image shaking detection unit, and determines whether image shaking is present or not according to whether a newly detected difference value has become lower than the held difference value or not.

11. An image pickup apparatus according to claim 10, wherein the determination unit updates the held difference value with the newly detected difference value when the newly detected difference value becomes lower than the held difference value, and determines that image shaking has disappeared when the updating has been performed more than a predetermined number of times.

12. An image pickup apparatus according to claim 11, further comprising a high frequency component detection unit which detects a high frequency component in an image frame,
wherein the determination unit does not update the held difference value with the difference value detected based on an image frame in which the high frequency component detected by the high frequency component detection unit is lower than the reference value, even if the difference value is lower than the held difference value.

13. An image pickup apparatus according to claim 1, further comprising a high frequency component detection unit which detects a high frequency component in an image frame,
wherein the determination unit determines whether a high frequency component detected by the high frequency component detection unit is lower than a reference value or not, and determines whether image shaking is present or not according to the difference value detected by the second image shaking detection unit, excluding from evaluation an image frame in which the high frequency component is determined to be lower than the reference value.

14. An image pickup apparatus according to claim 1, wherein the determination unit sets the difference value between an initial successive two image frames as the second threshold, and subsequently, when a difference value between newly calculated image frames is lower than the second threshold, updates the second threshold with the difference value between the newly calculated image frames, and determines that image shaking has become less, when the updating has been performed more than a predetermined number of times.

15. A method for controlling an image pickup apparatus having a function of detecting image shaking, comprising:
performing first image shaking detection based on a size of a motion vector which represents a movement amount of each pixel and is detected from a plurality of successively obtained image frames;
performing second image shaking detection by calculating a difference value obtained by comparing respective pixel values of pixels located identical positions in a plurality of successively obtained image frames;
determining whether image shaking detected by the first image shaking detection has converged by comparing the motion vector with a first threshold, and determining whether image shaking detected by the second image shaking detection has converged by comparing the difference value with a second threshold; and
determining that image shaking has disappeared, when, after image shaking detected in the first image shaking detection is determined to have converged, image shaking detected in the second image shaking detection is further determined to have converged;
wherein it is not determined that image shaking has disappeared before image shaking detected by the first image shaking detection is determined to have converged, even if image shaking detected by the second image shaking detection is determined to have converged.

* * * * *